(12) United States Patent
Soderman

(10) Patent No.: US 8,733,121 B2
(45) Date of Patent: May 27, 2014

(54) SNOW CONE AND SLUSHY DISPENSER

(76) Inventor: Richard J. Soderman, Clarkesville, GA (US)

( * ) Notice: Subject to any disclaimer, the term of this patent is extended or adjusted under 35 U.S.C. 154(b) by 260 days.

(21) Appl. No.: 13/291,602

(22) Filed: Nov. 8, 2011

(65) Prior Publication Data

US 2012/0227420 A1 Sep. 13, 2012

Related U.S. Application Data

(60) Provisional application No. 61/451,424, filed on Mar. 10, 2011.

(51) Int. Cl.
*A23G 9/00* (2006.01)

(52) U.S. Cl.
USPC ........ 62/342; 62/392; 62/68; 62/135; 62/137; 222/233; 222/234; 221/221; 221/222

(58) Field of Classification Search
USPC ................. 62/342, 392, 68, 135, 137, 340; 222/233, 234, 143.6, 144, 144.5, 53, 222/63, 146.6; 221/221, 222
See application file for complete search history.

(56) References Cited

U.S. PATENT DOCUMENTS

| | | | | |
|---|---|---|---|---|
| 3,862,702 | A * | 1/1975 | Johnson et al. | 221/1 |
| 5,948,456 | A * | 9/1999 | Jones et al. | 426/100 |
| 6,913,433 | B2 * | 7/2005 | Riesterer et al. | 414/795.6 |
| 7,308,916 | B2 * | 12/2007 | Akuzawa et al. | 141/174 |
| 2005/0242120 | A1 * | 11/2005 | Sato et al. | 222/146.6 |
| 2006/0261095 | A1 * | 11/2006 | Rebordosa et al. | 222/234 |
| 2007/0193299 | A1 * | 8/2007 | Landers et al. | 62/390 |
| 2008/0066483 | A1 * | 3/2008 | Klier et al. | 62/342 |
| 2010/0242497 | A1 * | 9/2010 | Bertone | 62/1 |

* cited by examiner

*Primary Examiner* — Cheryl J Tyler
*Assistant Examiner* — Ana Vazquez
(74) *Attorney, Agent, or Firm* — Bryan Cave LLP

(57) ABSTRACT

A frozen treat dispenser (11) dispenses a snow cone and/or a slushy, and has at least an ice storage bin (14) for storing ice (10), a cup de-nesting mechanism (49) to separate a cup from a stack having a plurality of cups, an ice grinder (21) to grind ice from the ice storage bin to produce snow (82), a flavor dispenser (25), a cup transport mechanism (23) to move the cup to a first position (40A) whereby the ice grinder can at least partially fill the cup with the snow and to a second position (40B) whereby the flavor dispenser can dispense at least one flavor onto the snow in the cup, and a processor (152) to control the operation of at least one of the cup de-nesting mechanism, the ice grinder, the flavor dispenser, or the indexer.

21 Claims, 9 Drawing Sheets

SNOW CONE AND SLUSHY DISPENSER

CROSS-REFERENCE TO RELATED APPLICATION

This application claims the priority of U.S. provisional patent application No. 61/451,424 filed Mar. 10, 2011, entitled "Snow Cone Dispenser", the disclosure of which is hereby incorporated by reference in its entirety herein.

TECHNICAL FIELD

This invention relates to ice making machines and, more particularly, to snow cone and slushy dispensers for such machines.

BACKGROUND

Self-service ice-making and dispensing machines are widely available in many parts of the country. Such machines are often used by campers, travelers, and persons who have larger-than-normal ice needs, such as for a party or, unfortunately sometimes, when electric power fails or a primary refrigeration appliance fails. A visit to an ice-making and dispensing machine may be very entertaining for the children the first few times, as they enjoy the experience of putting the money in the machine, pressing the buttons, hearing the machinery working behind the front panel, and finally the thump-bump of a bag of freshly-processed ice or the swoosh of ice sliding down a chute into the ice chest. This thrill, however, soon wears off, and the children then express the viewpoint that the trip has become boring.

SUMMARY

A frozen treat dispenser to dispense a frozen treat, such as a snow cone or a slushy, includes an ice storage bin, a cup de-nesting mechanism to separate a cup from a stack of cups, an ice grinder to grind ice from the ice storage bin to produce snow, a flavor dispenser, a cup transport mechanism to move the separated cup to a first position whereby the ice grinder can at least partially fill the cup with the snow and to a second position whereby the flavor dispenser can dispense at least one flavor onto the snow in the cup, and a processor to control the operation of at least one of the cup de-nesting mechanism, the ice grinder, the flavor dispenser, or the indexer.

A method of producing a frozen treat, such as a snow cone or a slushy, includes producing and storing ice accepting a selection of at least one flavor of a plurality of flavors for the frozen treat, automatically separating a cup from a stack of cups, grinding ice to produce snow, depositing the snow into the cup, moving the cup from the position where the snow was deposited to another position, and dispensing at least one flavoring fluid onto the snow in the cup.

DETAILED DESCRIPTION

Figure 1A:
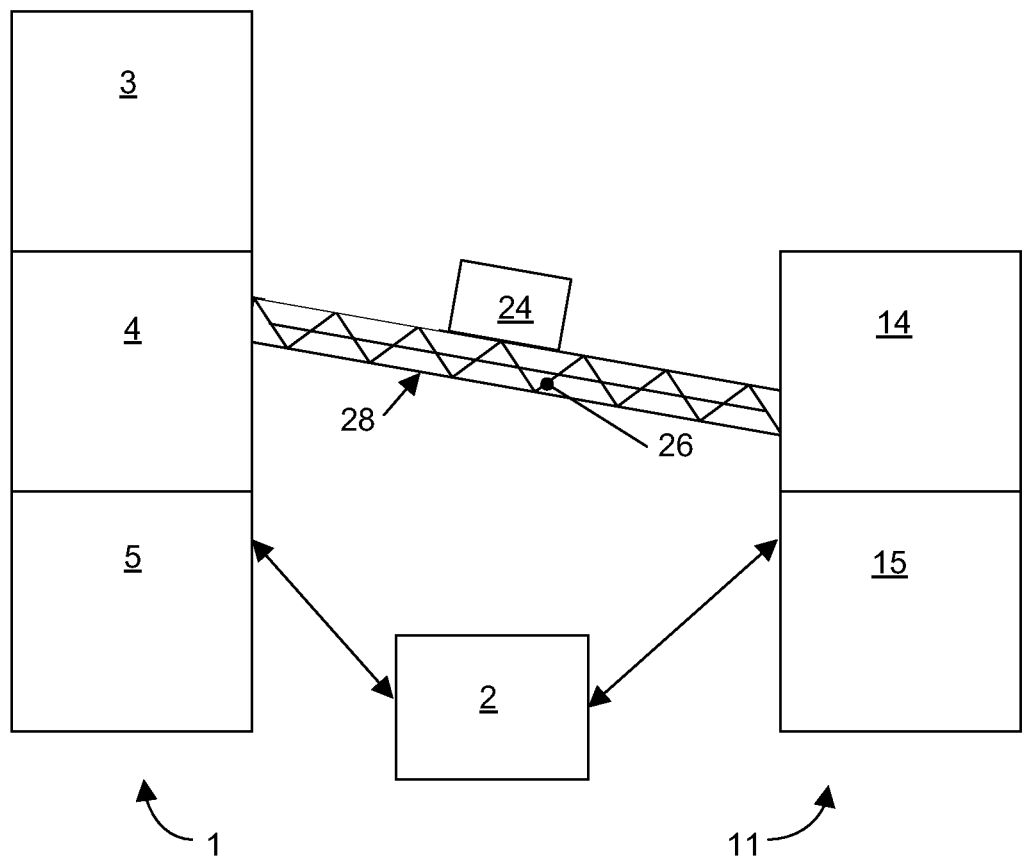
FIGS. 1A and 1B are block diagrams of two exemplary environments for the frozen treat dispenser.
Figure 1B:
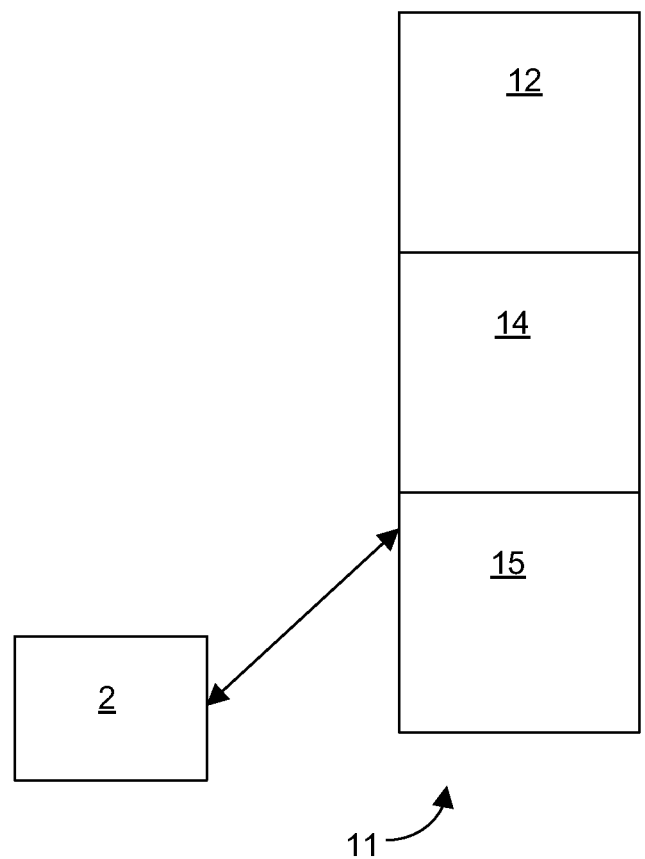

FIGS. 1A and 1B are block diagrams of two exemplary environments for a frozen treat dispenser 11 to produce and dispense a frozen treat, such as a snow cone or a slushy. The frozen treat dispenser 11 can be used in conjunction with an ice making and dispensing machine 1 or as a stand-alone device.

In one environment, as shown in FIG. 1A, the frozen treat dispenser 11 is used in conjunction with an ice making and dispensing machine 1. An exemplary ice making and dispensing machine 1 comprises an ice maker 3, an ice storage bin 4, an ice dispensing mechanism 5, and a user selection and payment interface 2. Ice making and dispensing machines are well known in the relevant art. In this environment, the frozen treat dispenser 11 preferably includes an ice storage bin 14, and a cup dispensing, filling, flavoring mechanism 15. The ice maker 3 provides ice to the storage bin 4, and an auger 26, driven by a motor 24, pushes the ice from the storage bin 4 through the conduit 28 into the storage bin 14. The driver motor 24 may be controlled by a sensor 20 (FIG. 2) which senses the level of ice in the storage bin 14. Thus, in this implementation, the ice maker 3 preferably provides the ice for both storage bins 4 and 14. In an alternative embodiment, the storage bin 14 is not used, and ice is provided directly from the storage bin 4 to the cup dispensing, filling, flavoring mechanism 15.

In another environment, as shown in FIG. 1B, the frozen treat dispenser 11 is a stand-alone device and includes an ice maker 13, an ice storage bin 14, a cup dispensing, filling, flavoring mechanism 15, and a user selection and payment interface 2.

Figure 2:
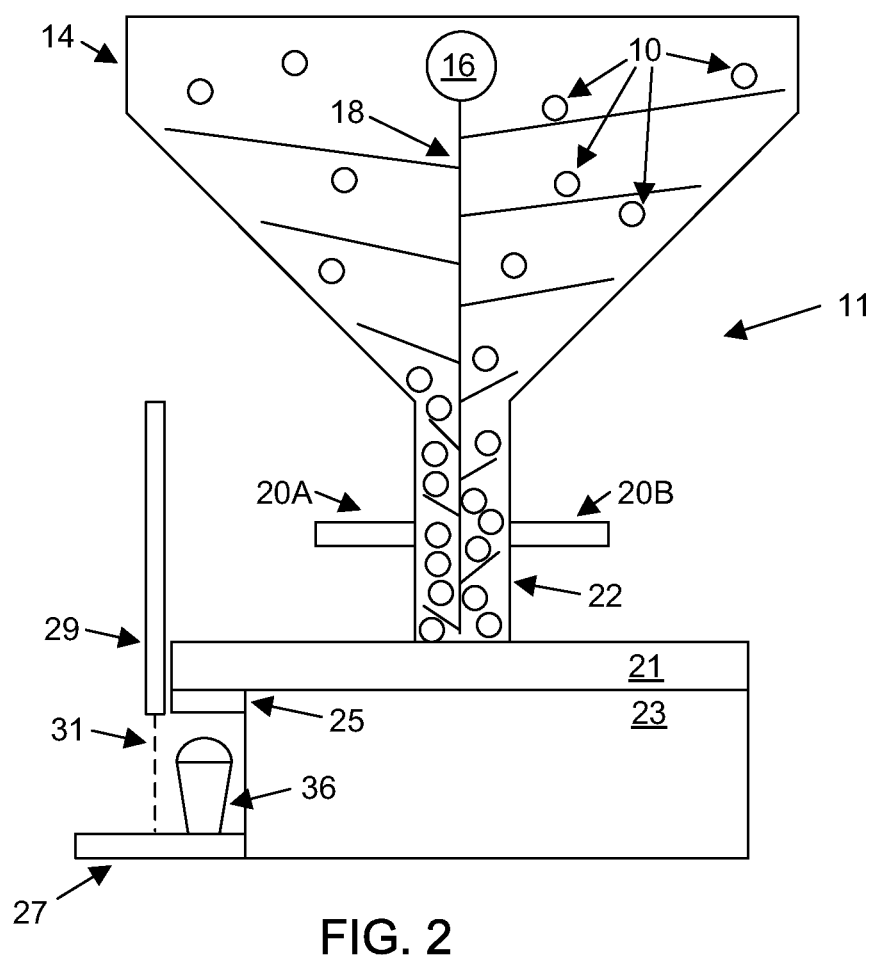
FIG. 2 is schematic diagram of an exemplary frozen treat dispenser.

FIG. 2 is schematic diagram of an exemplary frozen treat dispenser 11. An ice maker 3, 13 (FIGS. 1A, 1B) makes ice 10 which is deposited in the storage bin 14. A motor 16 and agitator 18 selectively break up and stir the ice 10 to allow it to pass down a feed passage 22. A sensor 20, such as an electric eye or a mechanical switch, monitors the level of ice 10 in the passage 22 and turns on the motor 16 to keep the passage 22 filled to a predetermined level. In one embodiment, this predetermined level is the amount of ice that needs to be in the passage 22 to produce enough "snow" to fill a cup 36 to the desired level. In another embodiment, this predetermined level is the amount of ice that needs to be in the passage 22 to produce enough "snow" to fill two or more cups 36 to the desired level.

Ice 10 in the passage 22 is controllably allowed to drop into an ice grinding and dispensing mechanism 21 which grinds or crushes the ice to produce a fine ground or crushed ice, or "snow", deposits the snow into a cup 36, and preferably also forms the snow at the top of the cup into a snowball shape.

More particularly, a cup dispensing and transport mechanism 23 extracts a cup 36 from a plurality of stacked cups (FIGS. 4A-4C), moves the extracted cup into position for filling with snow by the mechanism 21, and moves the filled cup into position for whereby a desired flavor or flavors can be added. A flavor dispensing mechanism 25 deposits or sprays the desired flavor or flavors onto the snow in the cup 36 to produce a "snow cone" or, if selected, a slushy.

The cup dispensing and transport mechanism 23 then moves the snow cone or slushy into position on a customer service shelf 27 whereby it can be reached and removed by a customer. Preferably, but optionally, the various mechanisms mentioned herein are behind a wall or panel 29, and a door 31 is automatically opened, or can be manually opened by the customer, to allow the customer to retrieve the snow cone or slushy. Another option is for the movement of the cup to end once the flavors are applied to the snow. In that case it preferred that a door 31 remain in a down or closed position until the flavors have been dispensed, opens for the customer to remove the snow cone or slushy, and then closes again. A sensor (infrared light or weight) can be used to provide a signal that the snow cone or slushy has been removed and that the door should be shut, either with or without a time delay.

Preferably, but not necessarily, operation of the various mechanisms is controlled by a controller, such as a microprocessor (FIG. 7) in the user selection and payment interface 2. Alternatively, the controller can be a separate component or can be included within a different mechanism, as convenient and desired. The controller preferably includes a processor, memory, and input and output interface ports to allow the controller to receive information regarding the user selection, payment, ice levels in the storage bin(s) 4, 14, whether cups 36 are available, operational status of the machine as a whole and of parts thereof, etc., and to control the various mechanisms, including the ice maker(s) 2, 13, ice dispensing mechanism 5 of an ice making machine 1, the motor 16, the ice grinding and dispensing mechanism 21, the cup dispensing and transport mechanism 23, the flavor dispensing mechanism 25 and, optionally, the door 23.

Figure 3:
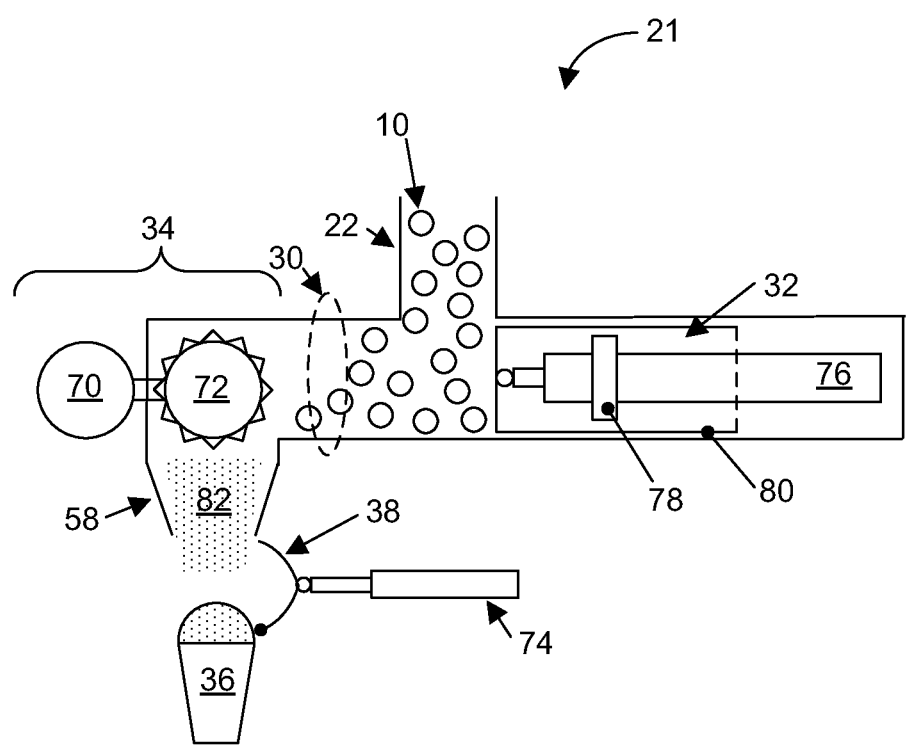
FIG. 3 is a schematic diagram of an exemplary ice grinding and dispensing mechanism.

FIG. 3 is a schematic diagram of an exemplary ice grinding and dispensing mechanism 21. As mentioned, a sensor 20 (FIG. 2) maintains the desired level of ice 10 in the feed passage 22. The ice 10 falls, or may be forced, such as through the operation of the agitator 18, through the feed passage 22 to a grinder feed conduit 30. A piston or compactor 32 pushes the ice in the conduit 30 toward a grinder device 34, which finely grinds the ice to produce "snow" 82 which then falls through the fill chute 58 into the cup 36. A piston 38 then presses the snow down into the cup 36.

The piston 32 comprises an air actuated cylinder 76, position sensor 78, and cowling 80. The cowling is connected to the cylinder and, when the cylinder is actuated (extended), the cowling 80 moves to push the ice in the conduit 30 toward and against the grinder blades 72. A motor 70 turns the grinder blades to grind the ice into snow 82, which falls through the fill chute 58 into the cup 36. The sensor 78 determines how much ice has been pushed toward, and ground into snow by, the grinder blades. Once the desired amount has been ground, the cylinder 76 is retracted, and pulls the cowling 80 back, and the motor 70 is turned off. When the cowling 80 is retracted ice in the passage 22 can fall into, and refill, the conduit 30.

In an alternative embodiment, the cylinder 76 and cowling 80 begin in the extended position, retract to allow ice 10 to drop from passage 22 into conduit 30, and then extend again to push the ice 10 in the conduit 30 toward the grinder 34. This embodiment serves to minimize the residual ice in conduit 30, thereby reducing the likelihood that a solid block of ice will form in the conduit 30.

Once the proper amount of ice has been ground into snow, an air cylinder 74 is actuated to extend, thereby causing the compactor 38 to press the snow 82 down into the cup. The cylinder 74 is then retracted, which pulls the compactor 38 away from the cup 36. This allows the cup 36 to be removed and a next cup 36 to be placed into position and filled. Preferably, but not necessarily, for aesthetic reasons, the compactor 38 is in the shape of a hemisphere so as to give the top of the snow cone a pleasing, rounded appearance.

Figure 4A:
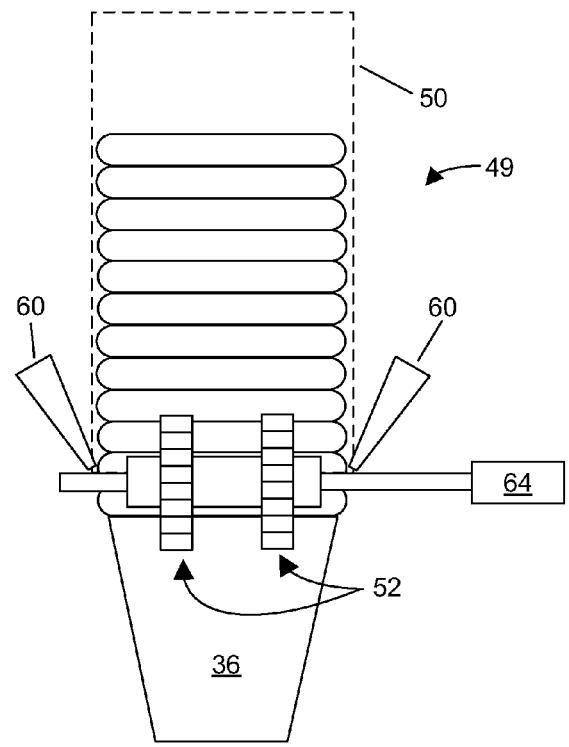
FIGS. 4A-4C are schematic diagrams of an exemplary cup de-nesting mechanism.
Figure 4C:
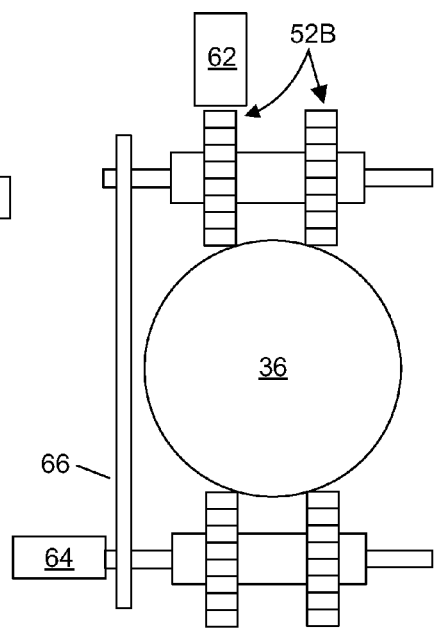
Figure 4B:
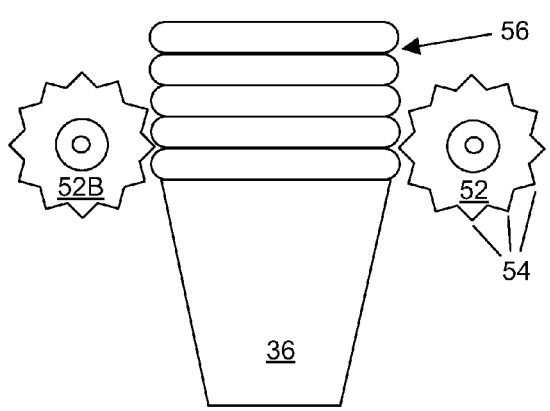

FIGS. 4A-4C are schematic diagrams of an exemplary cup de-nesting mechanism 49. A cup magazine 50 holds a plurality of stacked (nested) cups 36. A plurality of de-nesting sprockets 52, 52B have teeth 54 arranged so as to match the spacing of the cups 36 and to fit in the gap 56 between two cups 36. The teeth 54 separate the bottom cup from the stack of nested cups and two air jets 60, directed toward the gap 56 between the cups, provide a burst of air which helps to complete the separation and to force the bottom cup down into position 40A for filling.

A motor 64 drives the sprockets 52. A sprocket drive mechanism 66, such as but not limited to a chain or a direct drive, links the sprockets 52 on one side of the cup 36 to opposing sprockets 52B on the opposite sides of the cup 36. This provides separating forces on opposite sides of the cup so that the cup being separated and dispensed and does not twist or tilt and cause a jam. Alternatively, instead of drive 66, separate motors, such as stepper motors, could be used to independently drive the sprockets 52, 52B. Further, other separation/drive arrangements are possible, such as separating the cups at three, four, five or six distinct points rather than the four points shown herein.

A sensor 62, such as but not limited to a magnetic sensor, is responsive to the presence (or absence) of the teeth 54 of the sprocket near the sensor 62. Sensor 62 can therefore provide a signal to a controlling mechanism, such as but not limited to a microprocessor or logic circuitry, which can then cause the sprockets 52, 52B to rotate just enough to cause a single cup 36 to be dispensed and cause the jets 60 to provide the burst of air for separation. The signal provided by the sensor 62 can also be used for counting the total number of cups 36 which have been dispensed so as to provide an indication, if desired, that the cup magazine 50 should be refilled.

Figure 5:
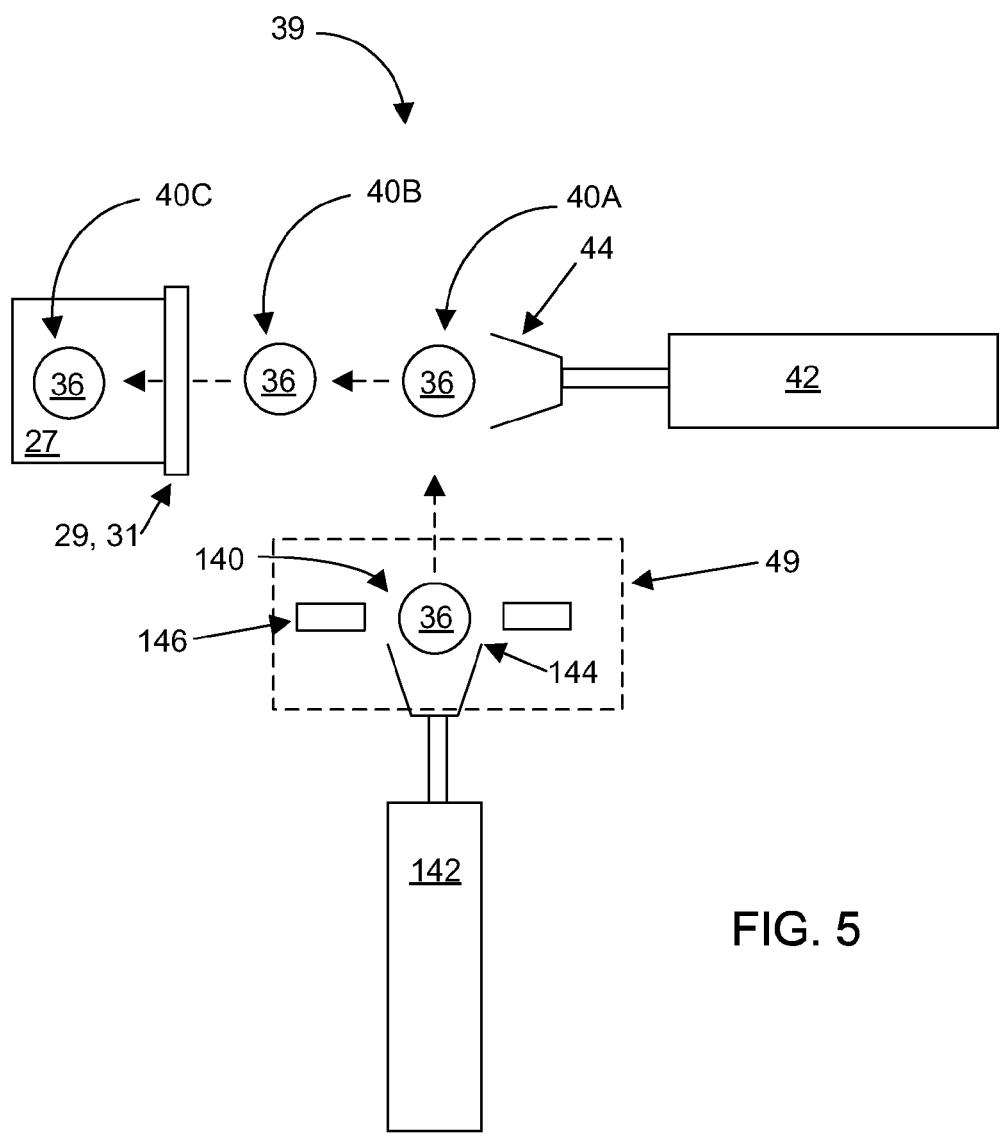
FIG. 5 is a schematic diagram of an exemplary cup transport mechanism.

FIG. 5 is a schematic diagram of an exemplary cup transport mechanism 39. Preferably, a cup 36 is initially dispensed into position 140 by the cup dispensing mechanism 49, indicated by the dashed box. A sensor 146 verifies that a cup 36 has been dropped into position 140. A pneumatic air cylinder 142 is then activated to extend and cause a pusher 144 to push (index) the cup 36 into position 40A to be filled with snow. The cup dispensing mechanism 49 preferably then separates and drops another cup 36 into position 140 while other operations (snow filling, flavor dispensing) are in process for the previously-dropped cup.

A pneumatic piston 42 is then actuated to extend and cause a cup pusher 44 to index the cup 36 from snow filling position 40A to flavor dispensing position 40B. One or more desired flavors are then withdrawn from the flavor canisters 46 (FIG. 6A) and dispensed by a dispensing head 126 (FIGS. 6A, 6B) onto the snow in the cup 36. The piston 42 then causes the cup pusher 44 to index the cup 36 from the flavor dispensing position 40B to the customer retrieval position 40C on the customer service shelf 27. The piston 42 then retracts the cup pusher 44 so as to allow a next cup to be indexed to position 40A.

The use of two separate mechanisms, one mechanism (49, 142, 144, 146) to dispense the cup to a first position 140 and index it to position 40A, and another mechanism (42, 44) to index the cup from position 40A to position 40C, allows the travel path of the cup to be folded, thereby conserving space and reducing the length of the overall machine, and also allows for a cup to be dispensed and ready for indexing even while a previously-dispensed cup is being indexed, filled with snow, and drenched in flavoring syrup.

As previously mentioned, another option is to allow the customer to retrieve the snow cone or slushy from position 40B after the flavoring fluid has been dispensed, thereby eliminating the need to index the cup to position 40C.

Figure 6A:
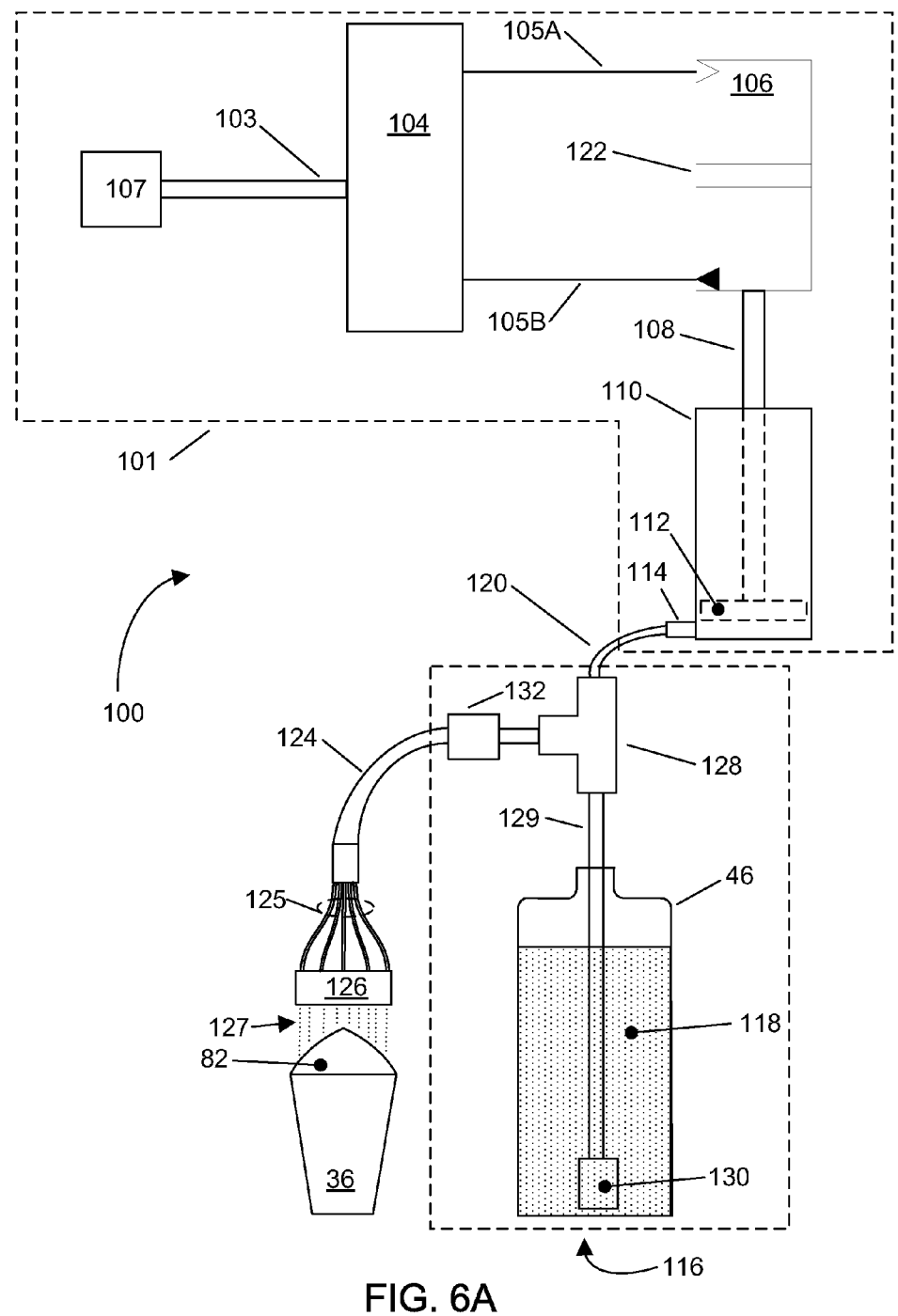
FIG. 6A is a schematic diagram of an exemplary single flavor dispensing machine.
Figure 7:
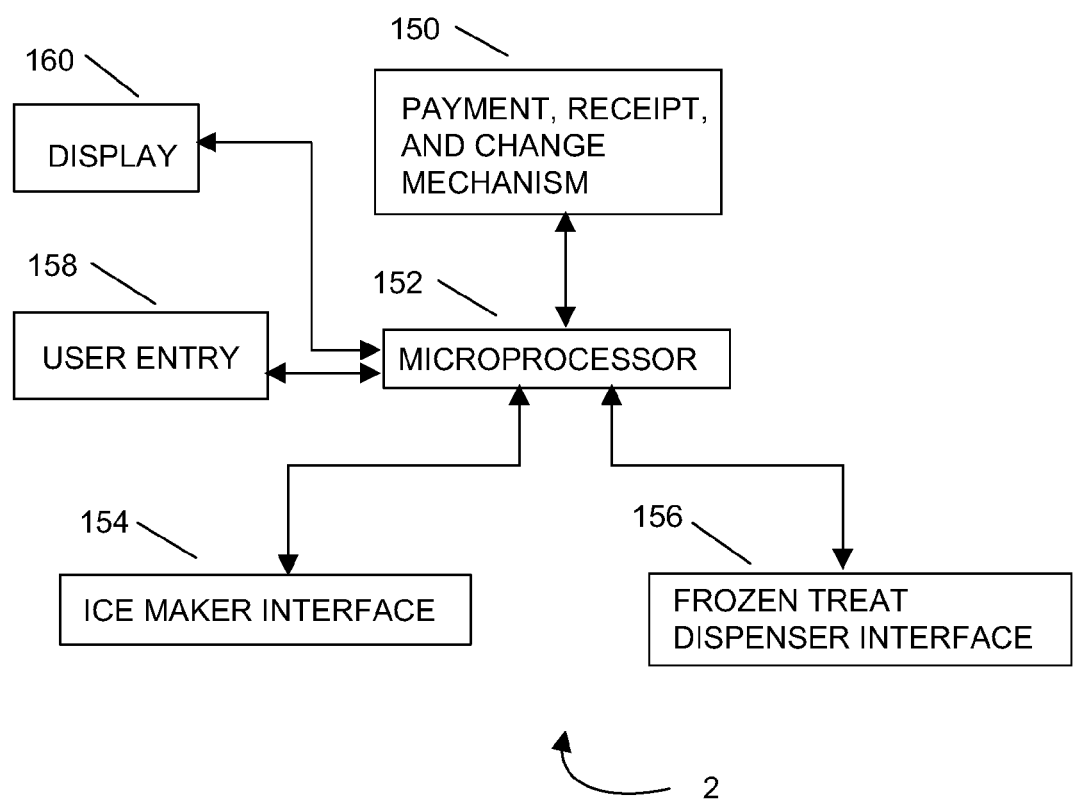
FIG. 7 is a block diagram of an exemplary user selection and payment interface.

FIG. 6A is a schematic diagram of an exemplary single flavor dispensing machine 100. An air valve 104 is connected via an air line 103 to an air supply 107 and to a controller, such as a microprocessor (FIG. 7). The air supply 107 is preferably a motor-driven air pump but can be any source of pressurized air. The air valve 104 has two outputs which are connected via air lines 105A, 105B to two corresponding input control ports of air cylinder 106. When the air valve 104 is actuated into one position, the air supply is connected to line 105B, which causes the shaft 108 of air cylinder 106 to retract. The shaft 108 is connected to the plunger 112 of cylinder 110. Thus, when the shaft of cylinder 106 retracts, it pulls the plunger 112 toward the top of cylinder 110, thereby creating a vacuum at port 114. This vacuum pulls the flavoring liquid 118 through line 129 out of the bottle 46 and into line 120. A position sensor 122 measures the volume of the liquid 118 which has been withdrawn by monitoring, for example, how far the shaft has been retracted. When the sensor 122 indicates that the correct liquid volume has been withdrawn, the air valve 104 is reversed, which causes the air supply to be connected to line 105A, which causes the shaft 108 of air cylinder 106 to extend. This pushes the plunger 112 toward the bottom of cylinder 110, therefore creating a positive pressure at port 114. This positive pressure forces the liquid in line 120 through Tee 128 and a check valve 132 into line 124. The liquid then goes through lines 125 into a dispensing head 126, which preferably has several openings for dispensing of the liquid 127 onto the snow 82 in the cup 36. The check valve 132 allows fluid to be forced to the dispenser head 126, but prevents air or fluid from being drawn back into line 124 so that a vacuum at port 114 can draw the fluid 118 from the bottle 46, thereby preventing contamination of the fluid 118.

A check valve 130 allows fluid 118 to be drawn into line 129 and then into line 120, but prevents liquid in lines 120 and 129 from being re-injected into the bottle 46, thereby preventing contamination of the fluid 118. Although the check valve 130 is shown as being at the end of the line 129 it may be at any point in line 129 or even between the Tee 128 and the line 129.

Preferably, but not necessarily, the fluid 118 is drawn out of the bottle 46 just prior to being dispensed onto the snow 82. This helps to prevent the fluid 118 from drying in the lines or becoming contaminated.

For convenience, components 103, 104, 105A, 105B, 106, 107, 108, 110, 112, 114 and 122 are referred to herein as a pumping assembly 101. Also for convenience, components 46, 118, 128, 129, 130 and 132 are referred to herein as a fluid extraction assembly 116.

Figure 6B:
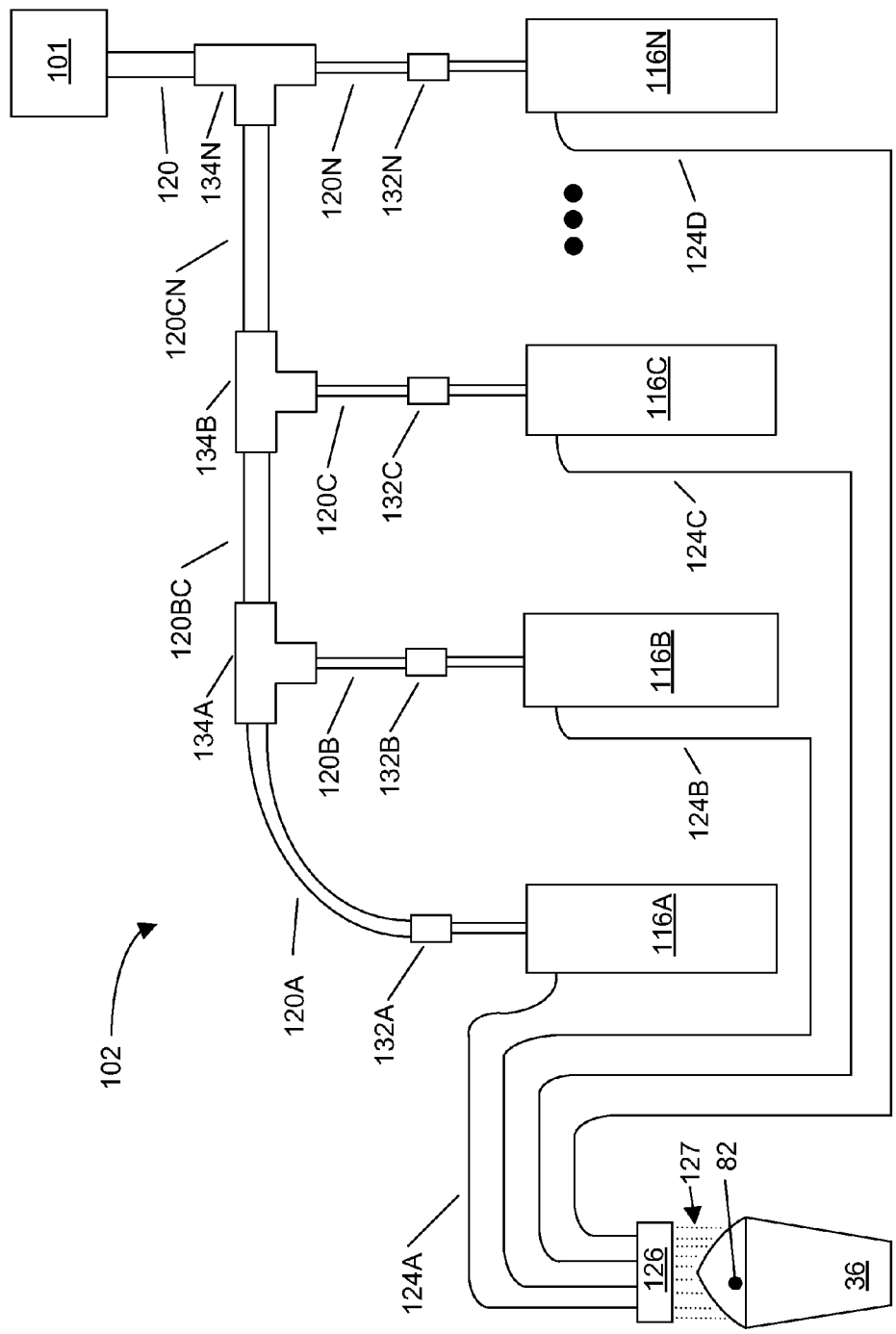
FIG. 6B is a schematic diagram of an exemplary multiple-flavor dispensing machine.

FIG. 6B is a schematic diagram of an exemplary multiple-flavor dispensing machine 102. This machine preferably has 4 single flavor setups and 1 multi-flavor setup, although more or fewer flavors may be provided. The exemplary multiple-flavor dispensing machine 102 is similar in construction and operation to the single flavor dispensing machine 100 but there are multiple fluid extraction assemblies 116 and associated lines, Tees, and check valves.

Tees 134A, 134B and 134N split line 120 into N different lines, 120A, 120B, 120C, and 120N, each of which is connected to a corresponding fluid extraction assembly 116A-116N through an intermediate check valve 132A, 132B, 132C and 132N. The Tees 134 allow the vacuum and pressure from pumping assembly 101 to draw the flavoring fluid 118 from the bottles 46 and then to force the flavoring fluid through lines 124A, 124B, 124C and 124N to and through the dispenser head 126. The check valves 132A-132N prevent fluid drawn from, for example, bottle 46 of fluid extraction assembly 116A from being forced into, for example, bottle 46 of fluid extraction assembly 116C. This prevents cross-contamination of the flavoring fluids 118. In the preferred embodiment, N is four, that is, there are four flavors.

Using the user selection and payment interface 2, the user can select a single flavor, or all flavors can be selected. As each flavor preferably has a different distinct color, the user, by selecting all flavors, can select a "rainbow" of flavors.

The "rainbow" multi-flavor selection operates in a manner similar to that of the single flavor machine 100 but flavoring syrup is now drawn from all bottles at once, and the flavors are dispensed into in the cup, preferably, for aesthetic purposes, in quadrants.

In another possible embodiment, two or three flavors may be selected. Operation is similar to the above but controllable valves (not shown) are preferably placed between the Tees 134 and the Tees 128 in the fluid extraction assemblies 116. The controllable valves selectively allow the vacuum to withdraw a particular flavor from a particular bottle 46, or the pressure to be applied to force the withdrawn liquid into the dispenser head 126. The controllable valves could be, for example, part of the check valves 132 or could be separate from the check valves 132. The controllable valves are preferably controlled by the microprocessor (FIG. 7) in the user selection and payment interface 2.

A "slushy" has a higher liquid-to-snow ratio than a snow cone and acts more like a fluid than a solid in that it does not hold its shape and, if the cup 36 is tilted, the liquid/ice mixture will tend to flow over the sides of the cup, especially if the cup is overfilled, that is, above the lip or rim of the cup 36. Therefore, for a slushy, the amount of ice that is ground into snow preferably is reduced so that the cup 36. The amount of ice that is to be ground can be controlled by adjusting the degree to which the cowling 80 is retracted to allow the ice 10 to fall into the conduit 30. Also, the amount of flavoring liquid that is dispensed is increased to achieve the desired texture. The amount of flavoring liquid can be controlled by using the sensor 122 to control the degree of retraction of the plunger 112. Other techniques can be used, if desired, to control the amount of ice and flavoring liquid. Also, for a slushy, the compactor 38 generally would not be used as the slushy would not hold the shape very well. Although it is preferred that the frozen treat dispenser can produce either a snow cone or a slushy, according the customer's selection, the frozen treat dispenser can, if desired, be configured so as to only produce a snow cone, or only produce a slushy.

FIG. 7 is a block diagram of an exemplary user selection and payment interface 2. Payment, receipt, and change mechanism 150 allows the user to pay using, for example, cash, credit card, or debit card, and optionally provides change and/or a receipt. Such mechanisms are well known in the art. The user entry device 158 allows the user to select a snow cone or a slushy and to specify a single flavor or multiple flavors, and which flavors. If the dispenser 11 is part of an ice making and dispensing machine, then the user can also select the quantity of ice and how the ice is to be delivered (bagged, or via a chute). The user entry device 158 may be a keypad and/or a touchscreen, or other device which allows the user to make the desired selection(s).

The display device 160 provides information to the customer as to what options are available, the status of the machine (working, out of one or more flavors, out of ice, out of order, no change, cash only, credit/debit card only, etc.), and an indication of what the user has paid or selected. The display device 160 may be, for example, an LED display, a screen, or a touchscreen. As indicated above, the user entry device 158 and the display device 160 may be a single device.

The ice maker interface 154 allows the microprocessor to receive signals from, and send signals to, the icemaking machine in order to monitor the status of the icemaking machine and to control the operation of the icemaking machine. Such interfaces are well known.

The frozen treat dispenser interface 156 allows the microprocessor to receive signals from, and send signals to, the frozen treat dispenser in order to monitor the status of the frozen treat dispenser and to control the operation of the frozen treat dispenser. Although a frozen treat dispenser as described herein is not known in the art, and therefore the specifics of the interface are not known in the art, such an interface would be similar to the icemaker interface 154 and the design of such an interface can be implemented by one of ordinary skill in the art after reading the detailed description herein of the operation of the frozen treat dispenser.

The microprocessor 152, as previously mentioned, monitors and controls the operation of the user entry device 158, the display 160, the payment, receipt and change mechanism 150, the frozen treat dispenser through the frozen treat dispenser interface 156 and, optionally, the ice maker machine through the ice marker interface 154.

Of course, electrical power, a water supply, and a line for disposing of liquid waste are required, but are not shown.

The microprocessor 152 includes, or is connected to, a memory containing operating instructions for the processor. The memory can also contain information about the operating status and history of the ice maker or the frozen treat dispenser. The user selection and payment interface 2 may also contain a modem (not shown) and/or an Internet connection (not shown) and/or a wireless connection (not shown), if desired, for reporting the operating status and history of the machine to the owner, a repair facility, and/or a maintenance facility, and/or for receiving operating instructions, new prices, updates, etc., from the owner, a repair facility, and/or a maintenance facility.

Therefore, either as a standalone machine or associated with an ice making and dispensing machine, and either dispensing a single-flavor or multiple-flavors, the machines 100, 102 provide for convenient and quick creation and dispensing of a snow cone or a slushy.

Consider now the operation of the machine described herein.

(A) An icemaker 12 makes ice 10 to fill a storage section 14 and feed passage 22; and a motor 16 and agitator 18 keep the ice stirred and fragmented. A sensor 20 controls the icemaker 12, directly or via the processor 152, to maintain ice in the storage section 14 and feed passage 22. (FIGS. 1B, 2)

(B) A motor 64, sprockets 52, and air jets 60 dislodge a cup 36 from a nest of stacked cups so that it falls into the first position 140 and then is indexed to position 40A beneath the fill chute 58. (FIGS. 4A-4C, 5)

(C) When the customer makes the selection of a snow cone or a slushy, and the desired flavor(s) and inserts the correct payment, an air cylinder 76, sensor 78, and cowling 80 operate to push a determined amount of ice through the conduit 30 toward the grinding mechanism 34. (FIG. 2)

(D) The motor 70 and grinder 72 of mechanism 34 grind the ice 10 into snow, which falls through chute 58 into the cup 36. (FIG. 3)

(E) A cylinder 74 forces a compactor 38 to compact the snow 82 down into the cup 36 if a snow cone is desired. (FIG. 3)

(F) A piston 42 and cup pusher 44 then push the cup 36 from snow dispensing position 40A to flavor dispensing position 40B. (FIG. 5)

(G) An air valve 104 and sensor 122 cause cylinders 106 and 110 to withdraw a determined amount of fluid from flavoring liquid bottle 46. The air valve 104 and cylinders 106 and 110 then cause this withdrawn liquid to be forced through dispenser head 126 onto the snow 82. (FIGS. 6A, 6B)

(H) The piston 42 and cup pusher 44 then push the cup 36 from flavor dispensing position 40B to customer retrieval position 40C; and then piston 42 and pusher 44 retract to the starting position 40A, ready for another cup to drop. (FIG. 5)

It should be noted that, if desired, step (B) can occur after the customer has made payment.

Preferably, but not necessarily, the machine also dispenses a spoon or straw to the customer.

Preferably, but not necessarily, the cup is dispensed and indexed into the staging position 140 even before the customer pays the money and selects the flavor.

Preferably, but not necessarily, the icemaker 12 is the icemaker 3 in an ice vending machine.

The machine therefore provides the option for a customer to obtain a delicious snow cone or slushy when the customer comes to get ice from the machine.

Unless otherwise indicated, all sizes, amounts, value, styles, dimensions, and physical properties mentioned in the specification and/or drawing are exemplary and are not critical. Thus, for example, a length of 2 inches, or a voltage rating of 110 VAC, or a component manufacturer and model number, power rating, etc., are exemplary and not limitations.

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. Accordingly, the scope of the invention is to be limited only by the claims below and the equivalents thereof.

The invention claimed is:

1. A frozen treat dispenser, comprising:
   an ice storage bin;
   a cup de-nesting mechanism to separate a first cup from a stack having a plurality of cups;
   an ice grinder to grind ice from the ice storage bin to produce snow;
   a flavoring liquid dispenser;
   an indexer to move the first cup to a first position whereby the ice grinder can at least partially fill the first cup with the snow and to a second position whereby the flavoring liquid dispenser can dispense at least one flavoring liquid onto the snow in the first cup; and
   a processor to control the operation of at least one of the cup de-nesting mechanism, the ice grinder, the flavoring liquid dispenser, or the indexer;
   wherein the cup de-nesting mechanism places the first cup in a starting position, and the indexer comprises:
      a first pneumatic piston to drive a first cup pusher form to index the first cup from the starting position to the first position; and a second pneumatic piston to drive a second cup pusher form to index the first cup from the first position to the second position.

2. The frozen treat dispenser of claim 1 wherein the cup de-nesting mechanism comprises:
a plurality of spaced-apart sprockets, each sprocket having a plurality of teeth, the teeth being adapted to be interposed between a lip of the first cup and a lip of a next cup in the stack;
at least one motor to drive the sprockets in a direction to cause the teeth to engage the lip of the first cup to urge the first cup away from the stack; and
a plurality of air jets to direct air between the first cup and the next cup in the stack to urge the first cup away from the stack.

3. The frozen treat dispenser of claim 2 wherein a first pair of sprockets are on a first shaft and are generally disposed on one side of the first cup and a second pair of sprockets are on a second shaft and are generally disposed on an opposite side of the first cup, the at least one motor being connected to at least one of the first shaft or the second shaft.

4. The frozen treat dispenser of claim 3 and further comprising a sprocket drive mechanism, the at least one motor driving the first shaft and the sprocket drive mechanism, and the sprocket drive mechanism driving the second shaft.

5. The frozen treat dispenser of claim 4 wherein the sprocket drive mechanism is either a chain drive or a direct drive.

6. The frozen treat dispenser of claim 1 wherein the ice grinder comprises:
a conduit having a first opening to receive the ice from the ice storage bin and a second opening to discharge the snow;
a grinding wheel to grind ice to produce the snow;
a motor to drive the grinding wheel;
a cowling, at least partially inside the conduit, to allow ice from the ice storage bin to enter the conduit via the first opening when the cowling is in a first cowling position, and to push ice in the conduit against the grinding wheel;
a pneumatic piston to drive the cowling; and
a chute to direct the snow from the second opening toward the first cup.

7. The frozen treat dispenser of claim 6 and further comprising:
a shaping mold to form snow in the first cup into a desired shape; and
a pneumatic piston to drive the shaping mold against the snow in the first cup.

8. The frozen treat dispenser of claim 6 wherein the pneumatic piston drives the cowling away from the first cowling position to push ice in the conduit against the grinding wheel.

9. The frozen treat dispenser of claim 1, wherein the first pneumatic piston causes the first cup pusher form to index the first cup in a first direction, and the second pneumatic piston causes the second cup pusher form to index the first cup in a second direction, the second direction being different than the first direction.

10. The frozen treat dispenser of claim 9 wherein the second direction is at an angle of approximately 90 degrees with respect to the first direction.

11. The frozen treat dispenser of claim 1, wherein the second pneumatic piston further drives the second cup pusher form to index the first cup from the second position to a third position whereby the frozen treat can be retrieved.

12. The frozen treat dispenser of claim 1 wherein the indexer further automatically indexes the first cup from the second position to a third position whereby the frozen treat can be retrieved.

13. The frozen treat dispenser of claim 1 and further comprising an ice maker to produce ice for the storage bin.

14. The frozen treat dispenser of claim 1 and further comprising an ice maker which is part of an ice making and dispensing machine, and an ice transport mechanism to move the ice from the ice maker to the storage bin.

15. The frozen treat dispenser of claim 1 wherein the flavor dispenser comprises a pump assembly to withdraw flavoring fluid from a flavoring fluid container and to push at least part of the withdrawn flavoring fluid to a dispensing head, and at least one check valve to prevent the withdrawn flavoring fluid from being reintroduced into the flavoring fluid container.

16. The frozen treat dispenser of claim 1 wherein the flavor dispenser comprises a pump assembly to withdraw at least one selected flavoring fluid from a plurality of flavoring fluid containers and to push the at least one selected withdrawn flavoring fluid to a dispensing head, and a plurality of check valves to prevent the at least one selected withdrawn flavoring fluid from being reintroduced into a flavoring fluid container.

17. The frozen treat dispenser of claim 1 wherein the flavor dispenser comprises a pump assembly to withdraw a plurality of flavoring fluids from a plurality of flavoring fluid containers and to push the plurality of withdrawn flavoring fluids to a dispensing head, and a plurality of check valves to prevent the withdrawn flavoring fluids from being reintroduced into a flavoring fluid container.

18. The frozen treat dispenser of claim 1 and further comprising a user selection panel to allow a user to pay for a frozen treat, and to select a flavor of a plurality of flavors.

19. The frozen treat dispenser of claim 1 wherein the processor controls the operation of the cup de-nesting mechanism, the ice grinder, the flavor dispenser, and the indexer.

20. The frozen treat dispenser of claim 1 wherein the amount of ice ground to produce snow, and the amount of flavoring liquid, are predetermined to produce a snow cone.

21. The frozen treat dispenser of claim 1 wherein the amount of ice ground to produce snow, and the amount of flavoring liquid, are predetermined to produce a slushy.

* * * * *